(12) United States Patent  
Maheshwari (10) Patent No.: US 8,856,637 B2  
(45) Date of Patent: Oct. 7, 2014

(54) APPLYING BORDERS TO EACH PAGE IN N-UP PRINTING

(75) Inventor: Naveen Maheshwari, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1534 days.

(21) Appl. No.: 11/705,458

(22) Filed: Feb. 13, 2007

(65) Prior Publication Data

US 2008/0062199 A1  Mar. 13, 2008

(30) Foreign Application Priority Data

Sep. 11, 2006  (KR) ......................... 10-2006-0087688

(51) Int. Cl.
*G06F 17/00* (2006.01)
*G06F 3/12* (2006.01)

(52) U.S. Cl.
CPC ............ *G06F 3/1205* (2013.01); *G06F 3/1208* (2013.01); *G06F 3/1256* (2013.01); *G06F 3/1253* (2013.01); *G06F 3/1285* (2013.01); *G06F 3/125* (2013.01); *G06F 3/1284* (2013.01)
USPC .......................................... 715/204; 715/200

(58) Field of Classification Search
USPC ................... 358/1.15; 715/200, 204
See application file for complete search history.

(56) References Cited

U.S. PATENT DOCUMENTS

| | | | |
|---|---|---|---|
| 6,847,466 B1* | 1/2005 | Gazdik et al. | 358/1.15 |
| 2002/0060805 A1* | 5/2002 | Tomita | 358/1.15 |
| 2004/0145610 A1* | 7/2004 | Brown et al. | 345/764 |

FOREIGN PATENT DOCUMENTS

JP          09-006899          1/1997

OTHER PUBLICATIONS

Epson Stylus CX6600 Reference Guide, p. 5 Jan. 2005.*
Microsoft Office 2003 all-in-one, 2003, Que Publishing, pp. 1-2, 334, 389-391, to Habraken.*
A Request for Review Opinions from an Inventor.
MAC OS X Server Print Service Administration for Version 10.4 or Later, Apple Computer, Inc., 2005, 019-0167/03-24-2005.
Korean Office Action dated Feb. 18, 2013 issued in KR Application No. 10-2006-0087688.

* cited by examiner

*Primary Examiner* — Eric A Rust
(74) *Attorney, Agent, or Firm* — Stanzione & Kim, LLP (57) ABSTRACT

A host apparatus capable of setting an N-up function and a control method thereof. The host apparatus provides a function of printing a plurality of pages on a single sheet of printing paper, and includes a Graphic User Interface (GUI) generating unit which generates a user interface to set a border attribute of the pages, a border generating unit which generates border data by incorporating the border attribute if the border attribute of the pages is set, and a driver control unit which converts the generated border data and print data corresponding to the plurality of pages into a printer language. Accordingly, a user is provided with customized N-up printing, which provides a printout of a plurality of pages on a single paper sheet with borders as desired by the user.

25 Claims, 7 Drawing Sheets

APPLYING BORDERS TO EACH PAGE IN N-UP PRINTING

CROSS-REFERENCE TO RELATED APPLICATIONS

This application claims priority under 35 U.S.C. §119(a) of Korean Patent Application No. 10-2006-087688, filed Sep. 11, 2006, in the Korean Intellectual Property Office, the entire disclosure of which is incorporated herein in its entirety by reference.

BACKGROUND OF THE INVENTION

1. Field of the Invention

The present general inventive concept relates generally to a host apparatus capable of setting an N-up function and a control method thereof. More particularly, the present inventive concept relates to a host apparatus capable of setting a customized N-up function, which enables printing of a plurality of pages on a single paper sheet in a manner such that a user can set or vary color, size or pattern of borders of the pages, and a control method thereof.

2. Description of the Related Art

An N-up function enables printing of a plurality of pages on a single piece of paper. To use the N-up function, a user selects a number of pages to print, using a Graphic User Interface (GUI).

More specifically, the user selects a 'Pages per Sheet' option on the GUI screen, and then selects a certain number of pages, for example, selects 4 pages. The user then checks off a 'Print Page Borders' box, according to which borders of respective pages are drawn. Accordingly, a printer driver generates print data, in which 4 pages are printed on a single sheet of printing paper along with the borders.

Conventionally, the user uses the printer driver to set the N-up function and is only allowed to select whether or not to draw the borders around the pages. Therefore, while it is possible to select whether to draw the borders or not, it is impossible to add other attributes of the borders. As a result, customized border functions cannot be provided to the user.

SUMMARY OF THE INVENTION

The present general inventive concept provides a host apparatus capable of setting an N-up function with customized options suitable to preferences of a user, with which a user can select various options of the borders which are drawn around pages printed on a single piece of paper according to the N-up function, and a control method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a host apparatus providing a function of printing a plurality of pages on a single sheet of printing paper, including a Graphic User Interface (GUI) generating unit which generates a user interface to set a border attribute of the pages, a border generating unit which generates border data by incorporating the border attribute, if the border attribute of the pages is set, and a driver control unit which converts the generated border data and print data corresponding to the plurality of pages into a printer language.

The border attribute may include a border style which is expressed by one selected from a line, a bitmap, and a character.

If the line is selected from the line, the bitmap and the character as the border style, the driver control unit controls the GUI generating unit to generate a popup window, such that color, shape, thickness and shadow of the line are set through a popup window.

A storage unit may be further provided, to store a plurality of bitmap files to express the border, and wherein, if the bitmap is selected from the line, the bitmap and the character, the driver control unit controls the GUI generating unit to generate a popup window which displays a list of the plurality of stored bitmap files such that a bitmap file is selected from the list and a display size of the selected bitmap file is set through the popup window.

A user input unit may be further provided to select at least one from text, numeral and symbol characters, and wherein, if the character is selected from the line, the bitmap and the character, the driver control unit controls the GUI generating unit to generate a popup window which includes an area through which at least one of the text, the numeral and the symbol characters is input, and an area through which color, size and intervals of the input character are set.

The border attribute may further include an edge type which is expressed by one selected from a round edge, a slash edge and a sharp edge.

The foregoing and/or other aspects and utilities of the present general inventive concept may also be achieved by providing a method of controlling a host apparatus which provides an N-up function to print a plurality of pages on a single sheet of printing paper, the method including generating and displaying a user interface to set an attribute of borders of the pages, generating a border data by incorporating the border attribute, if the attribute of the borders of the pages is set, and converting the generated border data and print data corresponding to the plurality of pages into a printer language.

In the generating and displaying of the user interface, the border attribute displayed in the user interface may include a border style which is expressed by one selected from a line, a bitmap, and a character.

If the line is selected from the line, the bitmap and the character as the border style, the method may further include generating and displaying a popup window, such that color, shape, thickness and shadow of the line are set through the popup window.

If the bitmap is selected from the line, the method may further include generating and displaying a popup window which displays a list of a plurality of pre-stored bitmap files such that, if a bitmap file is selected from the list, a display size of the selected bitmap file is set through the popup window.

If the character is selected from the line, the bitmap and the character, the method may further include generating and displaying a popup window which includes an area through which at least one of the text, the numeral and the symbol characters is input, and an area through which color, size and intervals of the input character are set.

The border attribute may further include an edge type which is expressed by one selected from a round edge, a slash edge and a sharp edge.

The foregoing and/or other aspects and utilities of the present general inventive concept may also be achieved by providing a computer readable medium to store a program to execute a method of controlling a host apparatus which provides an N-up function to print a plurality of pages on a single sheet of printing paper, the method including generating and displaying a user interface to set an attribute of borders of the pages, generating a border data by incorporating the border attribute, if the attribute of the borders of the pages is set, and converting the generated border data and print data corresponding to the plurality of pages into a printer language.

The foregoing and/or other aspects and utilities of the present general inventive concept may also be achieved by providing a method of controlling a host apparatus to set an N-up function to print a plurality of pages of document data on a single sheet of printing paper with a border, the method including receiving a request to display an N-up dialog, displaying the N-up dialog on a display unit, determining whether an N-up and a border display is requested, if the N-up and border display is requested, activating an N-up border menu, and selecting one or more border attributes in response to a user input using the N-up border menu.

The foregoing and/or other aspects and utilities of the present general inventive concept may also be achieved by providing a computer readable medium to store a program to execute a method of controlling a host apparatus to set an N-up function to print a plurality of pages of document data on a single sheet of printing paper with a border, the method including receiving a request to display an N-up dialog from a user input unit, displaying the N-up dialog on a display unit, determining whether an N-up and a border display is requested, if the N-up and border display is requested, activating an N-up border menu, and selecting border attributes in response to user input using the N-up border menu.

The foregoing and/or other aspects and utilities of the present general inventive concept may also be achieved by providing an image forming system, including a host apparatus to generate and display a user interface to set an attribute of borders of a plurality of pages, generate border data by incorporating the border attribute, if the attribute of the borders of the pages is set, and to convert the generated border data and print data corresponding to the plurality of pages into a printer language, and an image forming apparatus to receive the printer language and to print an image on a single sheet of printing paper according to the printer language including the border data and the print data of the plurality of page.

The foregoing and/or other aspects and utilities of the present general inventive concept may also be achieved by providing an image forming system, including a host apparatus to generate and display a user interface to set an attribute of borders of a plurality of pages, generate border data by incorporating the border attribute, if the attribute of the borders of the pages is set, and to convert the generated border data and print data corresponding to the plurality of pages into a printer language.

The foregoing and/or other aspects and utilities of the present general inventive concept may also be achieved by providing an image forming system including an image forming apparatus to receive printer language including border of a plurality of pages and print data of the plurality of pages, and to print the plurality of pages on a single sheet of printing paper according to the printer language.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
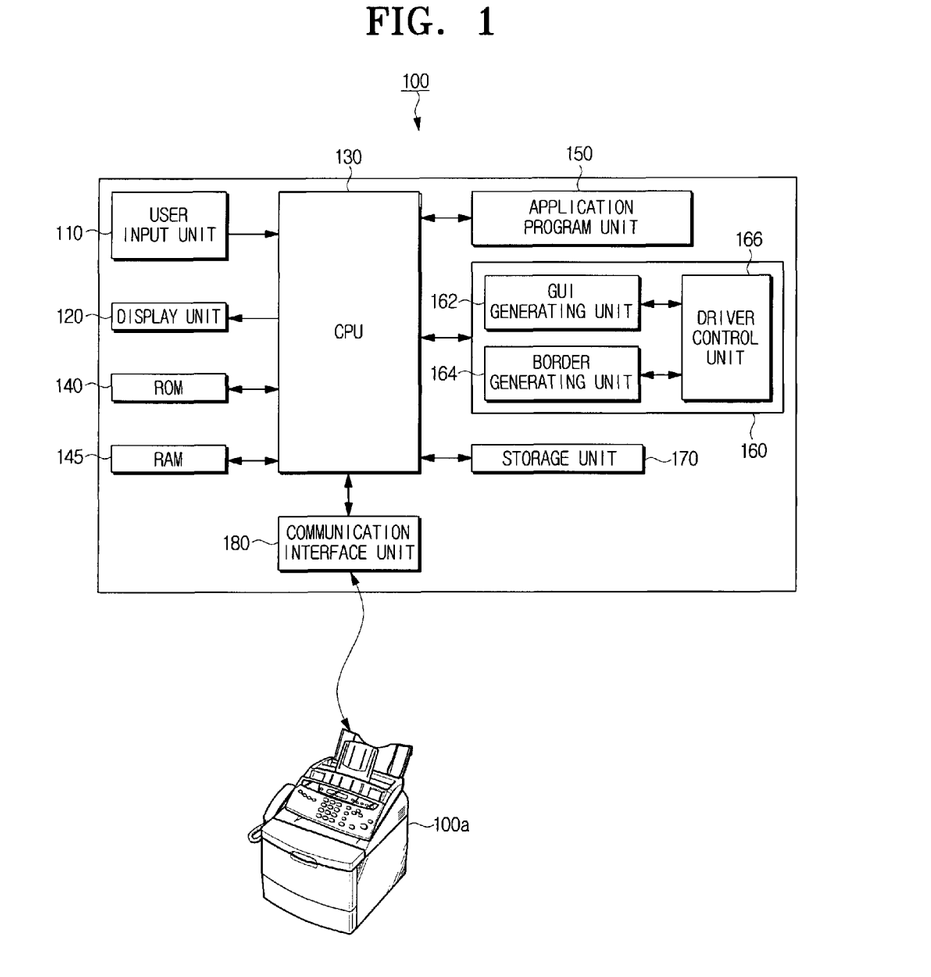
FIG. 1 is a block diagram illustrating a host apparatus according to an exemplary embodiment of the present general inventive concept.

FIG. 1 is a block diagram illustrating a host apparatus 100 according to an exemplary embodiment of the present general inventive concept.

Referring to FIG. 1, the host apparatus 100 converts document data to a printer language interpretable at an image forming apparatus 100a, using a driver 160 installed therein, and transmits the converted data to the image forming apparatus 100a. The host apparatus 100 may include a personal computer (PC) or laptop computer installed with the driver 160. The host apparatus 100 and the image forming apparatus 100a may constitute an image forming system.

The image forming apparatus 100a operates to form an image onto a printing paper, using an emulation corresponding to a converted printer language. The image forming apparatus 100a may be a printer or a multi-functional unit (MFU) having a printing function. The host apparatus 100 and the image forming apparatus 100a may be connected with each other via a wired or wireless network.

The host apparatus 100 according to an exemplary embodiment of the present general inventive concept may include a user input unit 110, a display unit 120, a central processing unit (CPU) 130, a read-only memory (ROM) 140, a random access memory (RAM) 145, an application program unit 150, the driver 160, a storage unit 170 and a communication interface unit 180.

The user input unit 110 operates as an interface which requests functions supported by the host apparatus 100, and may include a keyboard and/or a mouse. For example, the user input unit 110 may output a document print request or a print option select signal to the CPU 130.

The display unit 120 may display a document written in the application program unit 150, a user interface menu provided by the driver 160, or operational status of the host apparatus 100.

The CPU 130 may execute overall operation of the host apparatus 100, using various pre-stored control programs. For example, the CPU 130 may execute programs associated with the printer driver 160, in response to a user's print request input through the input unit 110 associated with the document written in the application program unit 150.

The ROM 140 may store basic information to check components of the host apparatus 100 prior to execution of an operating system such as Windows, or various control programs, while the RAM 145 may be loaded with and store application programs to be executed by the CPU 130, or processed data by the CPU 130.

The application program unit 150 provides application programs with which a user can write a variety of documents. Generally, the user may select a 'Print' menu among functions provided by the application program unit 150 to set basic print options associated with a printing operation.

The driver 160 is installed in the host apparatus 100 in accordance with the image forming apparatus 100a connected with the host apparatus 100, and operates to convert the document written in the application program unit 150 and the basic print options into a printer language. The driver 16 may additionally provide a print registration information menu, in which menus relating to a variety of print options are provided, to interface with the user. The driver 160 may include a Graphic User Interface (GUI) unit 162, a border generating unit 164 and a driver control unit 166.

The GUI generating unit 162 generates a print registration information menu to set details of the print options provided by the driver 160. More specifically, the print options may include paper size, watermark, print quality, or N-up function. An aspect of the exemplary embodiment of the present general inventive concept includes an N-up function which will be described below. With the N-up function, a plurality of pages (page images) can be printed on a single sheet of printing paper, and thus paper can be saved, and it is convenient because a user can see a plurality of pages side by side within the single sheet.

Figure 2:
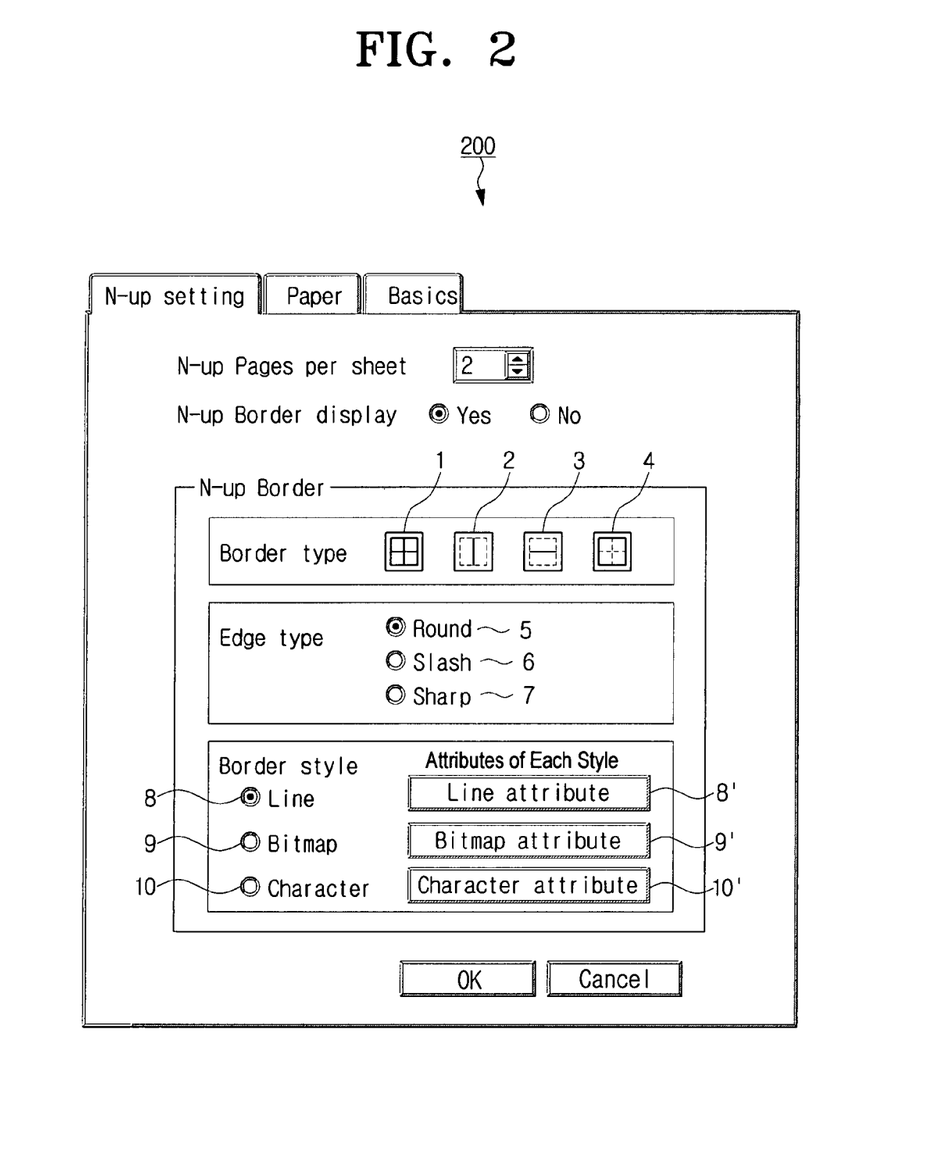
FIG. 2 illustrates an N-up dialog generated and provided by a Graphic User Interface (GUI) unit of FIG. 1 according to an exemplary embodiment of the present general inventive concept.

FIG. 2 illustrates an N-up dialog (interface or menu screen) provided by the GUI generating unit 162 of FIG. 1 according to an exemplary embodiment of the present general inventive concept.

Referring to FIGS. 1 and 2, a user is enabled to set an N-up function supported by the image forming apparatus 100a with more details, through an N-up dialog 200 displayed on the display unit 120. The N-up dialog 200 provides an interface with a user, and on the N-up dialog 200, a user is able to set whether to apply N-up processing, a number of pages to print on a single sheet, or attributes of borders of respective pages.

More specifically, the N-up dialog 200 may include menus such as 'pages per sheet', 'borders of pages', and if it is determined that the borders are drawn around the pages, and 'border type,' 'edge type,' 'border style,' and 'attributes of each style.'

The 'pages per sheet' is used to set the number of pages to be printed on a single paper sheet, and accordingly, the user may print a single page by selecting '1', two pages by selecting '2', and so on.

The 'borders of pages' is used to select whether or not to draw borders along the pages, if a plurality of pages are requested to be printed on a single sheet of paper, that is, if an N-up function is selected. If the user selects 'Yes' by using the user input unit 110, the 'N-up Border' is activated such that the user can set 'border type', 'edge type', 'border style' and 'attributes of each style'. The 'N-up Border' is inactivated if 'No' is selected. An example of selecting 'Yes' will be explained below.

The 'border type' sets types of the borders, and may include a cell type 1 to border four or more pages in a single paper sheet, and a portrait type 2, a landscape type 3 and a square type 4 to border two or more pages in a single paper sheet.

The 'edge type' sets types of the edges of the borders, and may include various types of edges such as a round edge 5, a slash edge 6, a sharp edge 7, or a star edge (not shown).

The 'border style' sets the styles of the borders, and the user may set a desired border style by selecting one of a line 8, a bitmap 9, and a character 10. The user may additionally set detailed attributes of each border style.

Figure 3A:
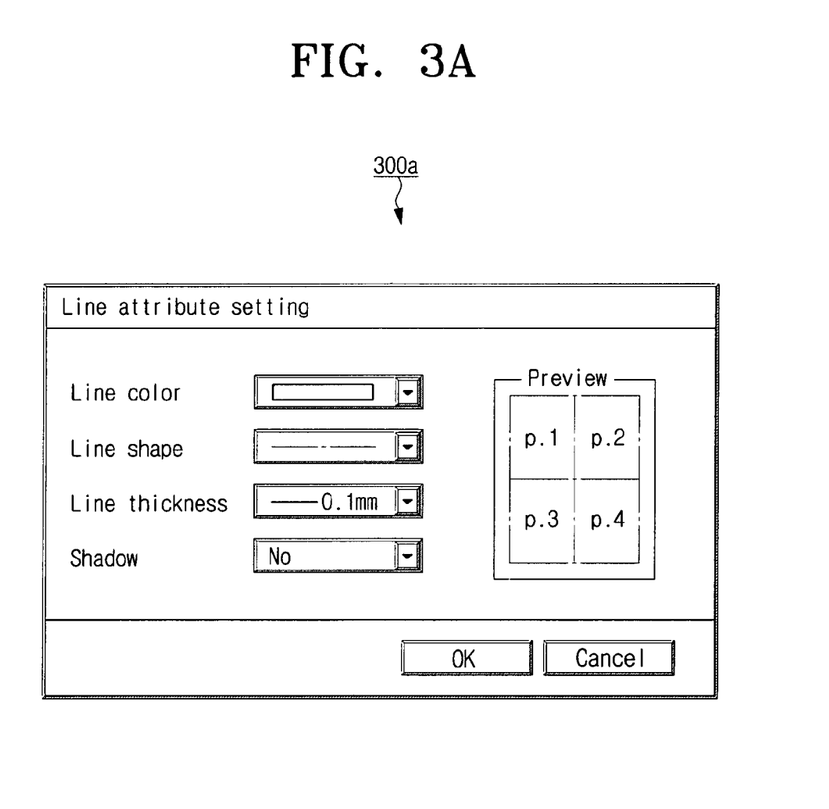
FIGS. 3A to 3C illustrate dialogs to set border attributes provided by a driver of FIG. 1 according to an exemplary embodiment of the present general inventive concept.

More specifically, if the user selects the line 8, using the user input unit 110, a line attribute 8' is activated and thus is selectable. Accordingly, if a user selects the line attribute 8', the GUI generating unit 162 generates a line attribute dialog as illustrated in FIG. 3A. The line attribute dialog 300a may be displayed on the display unit 120. The line attribute dialog 300a sets color, shape, thickness or shadow of a borderline, and provides a preview incorporating the user-selected attribute. For example, a document in the preview of FIG. 3A may be shown when the user selects four pages per sheet, the cell type 1 (refer to FIG. 2), and a one-dotted line may be displayed as the border line.

Meanwhile, if the user selects the bitmap 9 using the user input unit 110, a bitmap attribute 9' is activated. Accordingly, if a user selects the bitmap attribute 9', the GUI generating unit 162 generates a bitmap attribute dialog 300b as illustrated in FIG. 3B which shows the borders of the pages using one of pre-stored bitmap images.

An area 11 of the bitmap attribute dialog 300b displays an initial bitmap image or finally selected bitmap image. If a user selects 'More', the GUI generating unit 62 generates a file list popup window, using names and images of the bitmap files stored in the storage unit 170, which will be explained in detail below. A list of files is displayed on the display unit 120, and accordingly, if one of the files is selected from the list, the GUI generating unit 162 causes the selected new image to be displayed on the area 11. The bitmap attribute dialog 300b also sets a size of the selected bitmap image, and provides a preview incorporating the user-selected attribute.

Figure 3B:
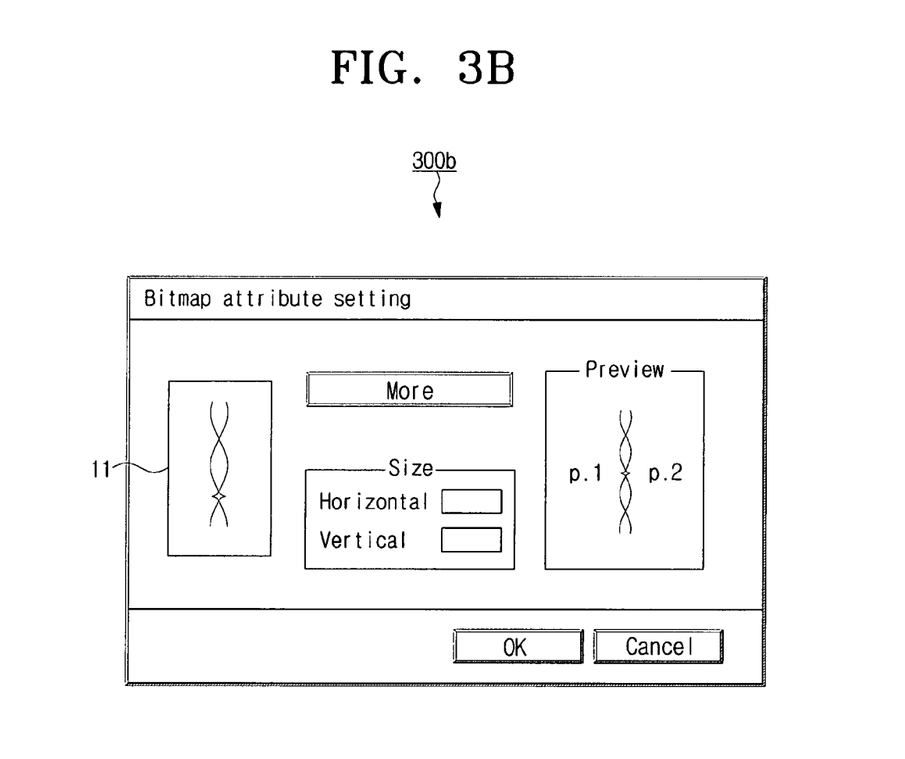

The document as illustrated in the preview of FIG. 3B is provided when the user selects two pages per sheet, the portrait 2 (refer to FIG. 2), and the above pre-stored bitmap image.

Figure 3C:
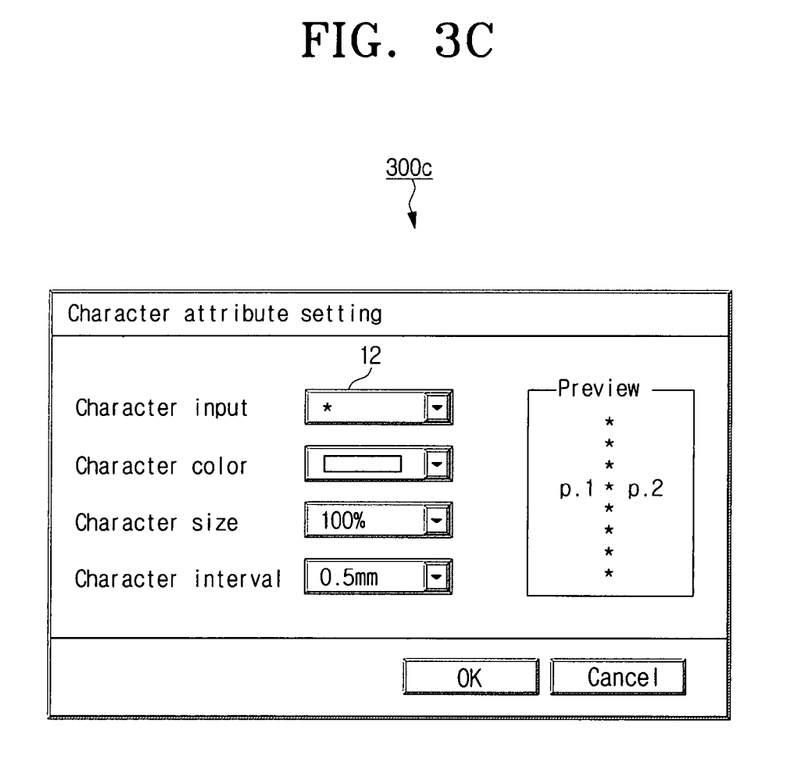

If the user selects the character 10, using the user input unit 110, a character attribute 10' is activated. Accordingly, if the user selects the character attribute 10', the GUI generating unit 162 generates a character attribute dialog 300c as a popup window, as illustrated in FIG. 3C.

The character attribute dialog 300c may include a character input area 12, and character color, size and interval settings, and provides a preview incorporating the user-selected attributes. The character input area 12 is provided such that a user can directly input at least one desired character including numbers, texts and symbols, using the user input unit 110. For example, a user may input an asterisk (*) and AND (&) in the character input area 12, and accordingly, the border generating unit 164 generates a border consisting of a series of alternating asterisks and ANDs. The preview of FIG. 3C shows a document incorporating the two pages per sheet, the portrait 2, and asterisk (*) as the border line.

Referring back to FIG. 1, the border generating unit 164 generates border data incorporating the selected border attributes, using FIGS. 2 and 3A to 3C.

The driver control unit 166 controls the operation of the driver 160. For example, the driver control unit 166 may control the GUI generating unit 162 to display the N-up dialog 200, if the N-up request is input through the user input unit 110.

Additionally, if the user selects the line 8 and the line attribute 8' from the N-up dialog 200, using the user input unit 110, the driver control unit 166 controls the GUI generating unit 162 to generate a dialog as illustrated in FIG. 3A as the popup window. If the bitmap 9 and bitmap attribute 9' are selected on the N-up dialog 200, the driver control unit 166 controls the GUI generating unit 162 to generate the dialog as illustrated in FIG. 3B as the popup window, and if the character 10 and the character attribute 10' are selected on the N-up dialog 200, the driver control unit 166 controls the GUI generating unit 162 to generate the dialog as illustrated in FIG. 3C as the popup window.

The driver control unit 166 requests the CPU 130 that the attributes associated with the borders set through FIGS. 2 and 3A to 3C be stored in the storage unit 170. Accordingly, the information pertaining to the border is stored in the storage unit 170. The user may select whether or not to store the information pertaining to the set or varied border.

The driver control unit 166 may also control the border generating unit 164 to generate border data using the information pertaining to the border set by the user, and causes the generated border data and the print data to be converted into image data, using a predefined printer language. The print data refers to data of the document to be printed which is written by the application program unit 150.

The communication interface unit 180 supports interface between the host apparatus 100 and the image forming apparatus 100a under the control of the CPU 130. For example, the communication interface unit 180 may transmit the image data output from the driver 160 to the image forming apparatus 100a, and receive information such as operational status from the image forming apparatus 100a.

Figure 4:
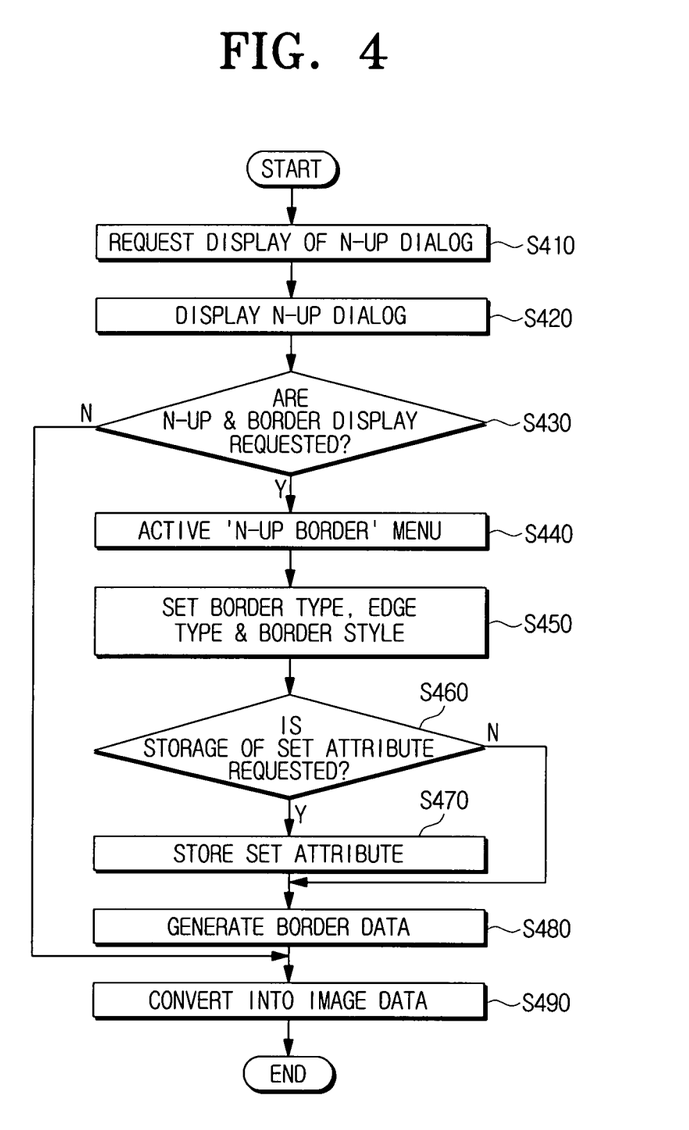
FIG. 4 is a flowchart illustrating a control method of the host apparatus of FIG. 1 according to an exemplary embodiment of the present general inventive concept.

FIG. 4 is a flowchart illustrating a control method of the host apparatus of FIG. 1 according to an exemplary embodiment of the present general inventive concept.

Referring to FIGS. 1 to 4, on receiving a request for an N-up dialog 200 through the user input unit 110, at operation S410, the driver control unit 166 controls the GUI generating unit 162 to generate the N-up dialog 200 as illustrated in FIG. 2, such that the N-up dialog 200 is displayed on the display unit 120 according to the control of the CPU 130, at operation S420.

At operation S430, if the user selects '2' pages per sheet and then chooses to draw borders along the pages, the driver control unit 166 activates the 'border menu' at step 440. Accordingly, the user may select details of the border attributes using the user input unit 110.

The user sets border type, edge type, border style, and attribute of each style, according to FIGS. 2 and 3A to 3C, and the user input unit 110, at operation S450. After operation S450, the storage unit 170, on receiving an attribute storage request at operation S460, stores the attributes set at operation S450, under the control of the driver control unit 166 and the CPU 130, at operation S470.

At operation S480, the border generating unit 164 generates border data, using the information pertaining to the border as set at operations S430 and S450.

Figure 5:
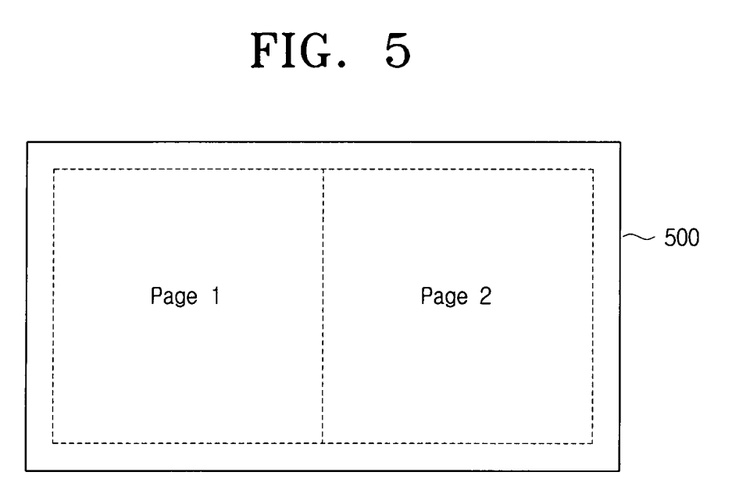
FIG. 5 illustrates a printout incorporating border attributes set in FIG. 4 according to an exemplary embodiment of the present general inventive concept.

At operation S490, the driver control unit 166 converts the print data transmitted from the application program unit 150 and the border data generated at operation S480 into image data, using the printer language. The converted image data is transmitted to the image forming apparatus 100a, through the communication interface unit 180, and printed onto a printing paper. For example, the image forming apparatus 100a outputs a printout 500 as illustrated in FIG. 5, according to the user selections, that is, two pages (p1, p2) per sheet, the cell type, and dotted border line set through the driver 160.

In the exemplary embodiments explained above, the driver programs are updatable. Accordingly, border type and style, attribute of each style, and edge type are not limited to the above examples, and can be added by updating of the driver program.

Furthermore, although the driver 160 is used in the above exemplary embodiment to set the details of the N-up attributes, it should not be construed as limiting, but other appropriate programs may be employed.

The present general inventive concept can be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains. The method illustrated in FIG. 4 can be stored in the computer-recorded medium in a form of computer-readable codes to perform the method when the computer reads the computer-readable codes of the recording medium.

With the host apparatus capable of setting N-up function and control method thereof according to exemplary embodiments of the present general inventive concept, a plurality of pages can be printed in a single sheet of printing paper, in a manner such that a user can set or vary types and styles, or edges of the borders of the pages. Therefore, a customized N-up function can be provided.

In other words, a user can set the shapes, colors, sizes and patterns of the borders as he wishes, and also can select the shapes of borders with not only the bitmap images, but also the characters such as texts and numbers.

The information about borders set by a user is storable, such that the user can use the same settings as long as he wishes. Accordingly, inconvenience of having to set the details of the borders can be reduced.

Additionally, because a preview is provided when setting the attributes of the borders, a user can set desired borders of the pages with ease and accuracy.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A host apparatus providing a function of printing a plurality of pages on a single sheet of printing paper, comprising:
   a Graphic User Interface (GUI) generating unit which generates one user interface to set the function of printing a plurality of pages on a single sheet and to set individually a border attribute of each of the plurality of pages set to be printed on the single sheet;
   a border generating unit which generates border data by incorporating the border attribute, if the border attribute of the pages is set; and
   a driver control unit which converts the generated border data and print data both corresponding to the plurality of pages into a printer language;

a storage unit which stores a plurality of bitmap files to express the border, and wherein when the border attribute comprises a border style which is expressed by a bitmap the driver control unit controls the GUI generating unit to generate a popup window which displays a list of the plurality of stored bitmap files such that a bitmap file is selected from the list and a display size of the selected bitmap file is set through the popup window.

2. The host apparatus of claim 1, wherein the border attribute further comprises a border style which is expressed by at least one of a line and a character.

3. The host apparatus of claim 2, wherein if the line is selected from the line, the bitmap and the character as the border style, the driver control unit controls the GUI generating unit to generate a popup window, such that color, shape, thickness and shadow of the line are set through the popup window.

4. The host apparatus of claim 2, further comprising:
a user input unit to select at least one from text, numeral and symbol characters as the character,
wherein if the character is selected from the line, the bitmap and the character, the driver control unit controls the GUI generating unit to generate a popup window which comprises an area through which at least one of the text, the numeral and the symbol characters is input, and an area through which color, size and intervals of the input character are set.

5. The host apparatus of claim 1, wherein the border attribute comprises an edge type which is expressed by one selected from a round edge, a slash edge and a sharp edge.

6. A method of controlling a host apparatus which provides an N-up function to print a plurality of pages on a single sheet of printing paper, the method comprising:
generating and displaying one user interface to set the N-up function of printing a plurality of pages on a single sheet and to set individually an attribute of borders of each of the plurality of pages set to be printed on the single sheet;
generating border data by incorporating the border attribute, if the attribute of the borders of the pages is set; and
converting the generated border data and print data both corresponding to the plurality of pages into a printer language,
wherein the border attribute comprises a border style which is expressed by a bitmap, and generating and displaying a popup window which displays a list of a plurality of pre-stored bitmap files such that, when a bitmap file is selected from the list, a display size of the selected bitmap file is set through the popup window.

7. The method of claim 6, wherein, in the generating and displaying of the user interface, the border attribute displayed in the user interface further comprises a border style which is expressed by at least one of a line and a character.

8. The method of claim 7, wherein if the line is selected from the line, the bitmap and the character as the border style, further comprising:
generating and displaying a popup window, such that color, shape, thickness and shadow of the line are set through the popup window.

9. The method of claim 7, wherein, if the character is selected from the line, the bitmap and the character, further comprising:
generating and displaying a popup window which comprises an area through which at least one of the text, the numeral and the symbol characters as the character is input, and an area through which color, size and intervals of the input character is set.

10. The method of claim 6, wherein the border attribute further comprises an edge type which is expressed by one selected from a round edge, a slash edge and a sharp edge.

11. A non-transitory computer readable medium to store a program to execute a method of controlling a host apparatus which provides an N-up function to print a plurality of pages on a single sheet of printing paper, the method comprising:
generating and displaying one user interface to set the N-up function to print a plurality of pages on a single sheet of printing paper and to set individually an attribute of borders of each of the pages set to be printed on the single sheet;
generating border data by incorporating the border attribute, if the attribute of the borders of the pages is set; and
converting the generated border data and print data both corresponding to the plurality of pages into a printer language,
wherein the border attribute comprises a border style which is expressed by a bitmap, and generating and displaying a popup window which displays a list of a plurality of pre-stored bitmap files such that, when a bitmap file is selected from the list, a display size of the selected bitmap file is set through the popup window when the bitmap is selected from the list.

12. A method of controlling a host apparatus to set an N-up function to print a plurality of pages of document data and border data associated with the plurality of pages of document data on a single sheet of printing paper, the method comprising:
receiving a request to display an N-up dialog;
displaying the N-up dialog on a display unit;
determining whether an N-up and a border display is requested;
if the N-up and border display is requested, activating an N-up border menu for setting individually border data associated with each of the plurality of pages within the N-up dialog; and
selecting one or more border attributes in response to a user input using the N-up border menu,
wherein the border attributes comprise a border style which is expressed by a bitmap, and generating and displaying a popup window which displays a list of a plurality of pre-stored bitmap files such that, when a bitmap file is selected from the list, a display size of the selected bitmap file is set through the popup window when the bitmap is selected from the line.

13. The method of claim 12, wherein the selecting of the border attributes comprises:
setting a border type using the user input unit.

14. The method of claim 13, wherein the border type is selected from one of a cell type, a portrait type, a landscape type, and a square type.

15. The method of claim 12, wherein the selecting of the border attributes comprises setting an edge type using the user input.

16. The method of claim 15, wherein the edge type is selected from one of a round type, a slash type, and a sharp type.

17. The method of claim 12, wherein the selecting of the border attributes comprises setting a border style using the user input.

18. The method of claim 17, wherein the border style is selected from one of a line style, a bitmap style, and a character style.

19. The method of claim 18, further comprising:
if the line style is selected as the border style, activating a line attribute dialog to select line attributes;
if the bitmap style is selected as the border style, activating a bitmap attribute dialog to select bitmap attributes; and
if the character style is selected as the border style, activating a bitmap attribute dialog to select character attributes.

20. The method of claim 12, further comprising:
providing a display dialog prompting the user to select whether or not the selected border attributes are to be stored; and
if the user requests that the selected border attributes be stored, storing the selected border attributes in a storage unit.

21. The method of claim 20, further comprising:
generating print data corresponding to the document data;
generating border data corresponding to the selected border attributes; and
converting the generated border data and the generated print data into output image data.

22. The method of claim 21, wherein the converting is performed by a driver control unit using a predetermined printer language.

23. A non-transitory computer readable medium to store a program to execute a method of controlling a host apparatus to set an N-up function to print a plurality of pages of document data and border data associated with the plurality of pages of document data on a single sheet of printing paper, the method comprising:
receiving a request to display an N-up dialog from a user input unit;
displaying the N-up dialog on a display unit;
determining whether an N-up and a border display is requested;
if the N-up and border display is requested, activating an N-up border menu for setting individually border data associated with each of the plurality of pages within the N-up dialog; and
selecting border attributes in response to user input using the N-up border menu,
wherein the border attributes comprise a border style which is expressed by a bitmap, and generating and displaying a popup window which displays a list of a plurality of pre-stored bitmap files such that, when a bitmap file is selected from the list, a display size of the selected bitmap file is set through the popup window when the bitmap is selected from the line.

24. An image forming system, comprising:
a host apparatus to generate and display one user interface to setup a function to print data of a plurality of pages on a single sheet of printing paper and to set individually an attribute of borders of each of a plurality of pages set to be printed on the single sheet, generate border data by incorporating the border attribute, if the attribute of the borders of the pages is set, and to convert the generated border data and the print data both corresponding to the plurality of pages into a printer language; and
an image forming apparatus to receive the printer language and to print an image on a single sheet of printing paper according to the printer language including the border data and the print data of the plurality of pages,
wherein the attribute of borders comprise a border style which is expressed by a bitmap,
wherein the host apparatus includes a storage unit which stores a plurality of bitmap files to express the border, and
wherein when the attribute of borders comprises the border style which is expressed by the bitmap, the driver control unit controls the GUI generating unit to generate a popup window which displays a list of the plurality of stored bitmap files such that a bitmap file is selected from the list and a display size of the selected bitmap file is set through the popup window.

25. An image forming system, comprising:
a host apparatus to generate and display one user interface to setup a function to print data of a plurality of pages on a single sheet of printing paper and to set individually an attribute of borders of each of a plurality of pages set to be printed on the single sheet, generate border data by incorporating the border attribute, if the attribute of the borders of the pages is set, and to convert the generated border data and print data both corresponding to the plurality of pages into a printer language,
wherein the attribute of borders comprise a border style which is expressed by a bitmap,
wherein the host apparatus includes a storage unit which stores a plurality of bitmap files to express the border, and
wherein when the attribute of the borders comprises a border style which is expressed by the bitmap, the driver control unit controls the GUI generating unit to generate a popup window which displays a list of the plurality of stored bitmap files such that a bitmap file is selected from the list and a display size of the selected bitmap file is set through the popup window.

* * * * *

UNITED STATES PATENT AND TRADEMARK OFFICE
CERTIFICATE OF CORRECTION

PATENT NO. : 8,856,637 B2  
APPLICATION NO. : 11/705458  
DATED : October 7, 2014  
INVENTOR(S) : Naveen Maheshwari Page 1 of 1

It is certified that error appears in the above-identified patent and that said Letters Patent is hereby corrected as shown below:

In the Claims

Column 9, line 4, in claim 1, delete "bitmap" and insert -- bitmap, --, therefor.

Signed and Sealed this
Second Day of June, 2015

Michelle K. Lee
*Director of the United States Patent and Trademark Office*